United States Patent
Buer et al.

(10) Patent No.: US 8,997,192 B2
(45) Date of Patent: *Mar. 31, 2015

(54) SYSTEM AND METHOD FOR SECURELY PROVISIONING AND GENERATING ONE-TIME-PASSWORDS IN A REMOTE DEVICE

(71) Applicant: Broadcom Corporation, Irvine, CA (US)

(72) Inventors: Mark Buer, Payson, AZ (US); Douglas Allen, Wilmington, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/896,774

(22) Filed: May 17, 2013

(65) Prior Publication Data
US 2013/0269012 A1     Oct. 10, 2013

Related U.S. Application Data

(63) Continuation of application No. 11/524,508, filed on Sep. 21, 2006, now Pat. No. 8,468,361.

(60) Provisional application No. 60/718,999, filed on Sep. 21, 2005.

(51) Int. Cl.
| | |
|---|---|
| G06F 7/04 | (2006.01) |
| H04L 29/06 | (2006.01) |
| G06F 21/31 | (2013.01) |

(52) U.S. Cl.
CPC .......... *H04L 63/0838* (2013.01); *H04L 63/083* (2013.01); *G06F 21/31* (2013.01); *H04L 63/0428* (2013.01)

USPC .............. 726/6; 726/18; 713/168; 713/173; 713/182; 380/28

(58) Field of Classification Search
CPC .............. H04L 63/0428; H04L 63/083; H04L 63/0838; G06F 21/31
USPC .............. 713/168, 173, 182; 726/6, 26, 18; 380/28
See application file for complete search history.

(56) References Cited

U.S. PATENT DOCUMENTS

| | | | |
|---|---|---|---|
| 6,928,558 B1 * | 8/2005 | Allahwerdi et al. | 726/9 |
| 7,100,195 B1 * | 8/2006 | Underwood | 726/2 |
| 7,231,526 B2 * | 6/2007 | Hon et al. | 713/185 |

(Continued)

OTHER PUBLICATIONS

Chang et al., A Secure One-time Password Authentication Scheme Using Smart Cards without Limiting Login Times, Oct. 2004, ACM, vol. 38 Issue 4, pp. 80-90.

*Primary Examiner* — Aravind Moorthy
*Assistant Examiner* — Peiliang Pan
(74) *Attorney, Agent, or Firm* — Sterne, Kessler, Goldstein & Fox P.L.L.C.

(57) ABSTRACT

A secure processor such as a TPM generates one-time-passwords used to authenticate a communication device to a service provider. In some embodiments the TPM maintains one-time-password data and performs the one-time-password algorithm within a secure boundary associated with the TPM. In some embodiments the TPM generates one-time-password data structures and associated parent keys and manages the parent keys in the same manner it manages standard TPM keys.

26 Claims, 8 Drawing Sheets

(56) References Cited

U.S. PATENT DOCUMENTS

| | | |
|---|---|---|
| 7,571,489 B2 | 8/2009 | Ong et al. |
| 7,600,134 B2 | 10/2009 | Catherman et al. |
| 2005/0166051 A1* | 7/2005 | Buer .......................... 713/173 |
| 2005/0182973 A1 | 8/2005 | Funahashi et al. |
| 2006/0083228 A1 | 4/2006 | Ong et al. |
| 2006/0085845 A1* | 4/2006 | Davis et al. ...................... 726/6 |
| 2006/0107032 A1 | 5/2006 | Paaske et al. |
| 2006/0129824 A1* | 6/2006 | Hoff et al. ..................... 713/176 |
| 2007/0168048 A1 | 7/2007 | Allen et al. |
| 2007/0174616 A1 | 7/2007 | Buer |

* cited by examiner

SYSTEM AND METHOD FOR SECURELY PROVISIONING AND GENERATING ONE-TIME-PASSWORDS IN A REMOTE DEVICE

CROSS REFERENCE TO RELATED APPLICATIONS

This application is a continuation of U.S. patent application Ser. No. 11/524,508, filed Sep. 21, 2006, which claims the benefit of U.S. Provisional Application No. 60/718,999, filed Sep. 21, 2005, all of which are incorporated by reference herein.

TECHNICAL FIELD

This application relates to data communication and processing and, more specifically, to a system and method utilizing one-time-passwords.

BACKGROUND OF THE INVENTION

Various techniques are known for securing access to on-line services such as network access, on-line financial services, etc. A typical technique requires a user to enter credentials such as a user name and password to gain access to an on-line service. Such techniques are susceptible, however, to being comprised through the use of various on-line or computer-based attacks.

As an example, code such as a virus or spyware may be surreptitiously installed on a user's computer. The code may log the user's keystrokes and send the logged data to an unauthorized person (e.g., via the computer's network connection). In the event the code logs the user's keystrokes when the user logs into an on-line service, an unauthorized person may gain access to the user's credentials. The unauthorized person may then use the user's credential to gain access to the corresponding service, e.g., the user's on-line bank account, brokerage account, etc.

As another example, a user may be tricked by a phishing scheme into accessing a fake website that looks like the website the user uses to access an on-line service. In this case, the user, believing that he or she has accessed a valid website, may provide credentials to the fake website. The operator of the website may then use the user's credential to gain access to the corresponding service.

Similarly, a man-in-the-middle scheme involves intercepting communications between a user and a server where the interception is transparent to the user and server. In other words, the user is led to believe that he or she is in direct communication with the server and vice versa. In actuality, however, the man-in-the-middle may have established separate connections with the user's computer and the server. As a result, the man-in-the-middle may be logging all of the communications and may thus obtain sensitive information such as the user's credentials.

BRIEF DESCRIPTION OF THE DRAWINGS

Further embodiments, features, and advantages of the present invention, as well as the operation of the various embodiments of the present invention, are described below with reference to the accompanying figures. The figures, which are incorporated herein and form a part of the specification, illustrate the present invention and together with the description further serve to explain the principles of the invention and to enable a person skilled in the pertinent art to make and use the invention. In the drawings, like reference numbers indicate identical or functionally similar elements. Additionally, the left-most digit of the reference number indicates a drawing in which the reference number first appears.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals may be used to denote like features throughout the specification and figures.

DETAILED DESCRIPTION

An embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other systems and applications.

Figure 1:
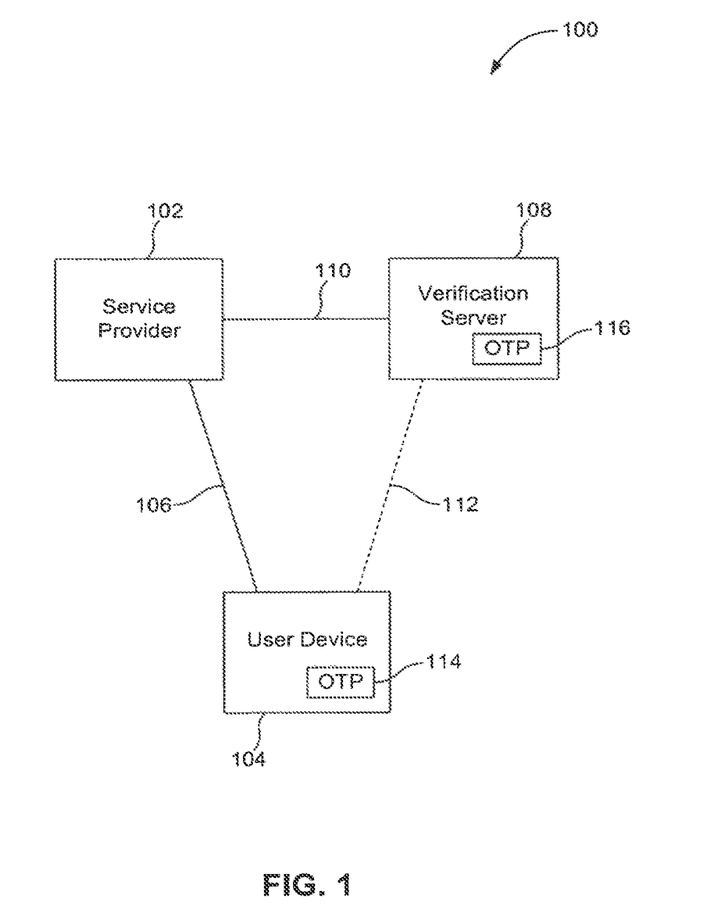
FIG. 1 is a simplified block diagram of one embodiment of networked system constructed in accordance with the invention.

FIG. 1 illustrates one embodiment of a system 100 that includes one or more service providers and one or more user communication devices. In general, a service provider 102 may comprise any hardware and/or code that facilitate providing a service. For example, a service provider 102 may consist of a processing system that processes requests for service, verifies whether the requester is authorized to access the service and provides or facilitates the requested access. In general, a user device 104 may comprise any hardware and/or code that facilitates access to a service. For example, a device 104 may comprise a computing system such as, without limitation, a personal computer (e.g., a laptop or desktop computer), a phone (e.g., a cellular phone), a personal data assistant, a personal entertainment device, etc.

In some embodiments a user may use a device 104 to access a service provided by the service provider 102. For example, the device 104 may provide a mechanism for the user to connect to the service provider 102 and send credentials to it.

In some embodiments a device may be configured to generate and/or maintain the credentials. For example, the device may include a secure processor (not shown in FIG. 1) that securely generates and or stores credentials to be used to access a service.

In either event, the device 104 and the service provider 102 may communicate via a communication channel 106 to initiate access to a service, provide credentials and provide access to a service. In some embodiments the communication channel utilizes a wired or wireless data network.

The service provider may restrict access to a service through the use of a one-time-password (OTP). Briefly, a one-time-password-based authentication procedure may involve both the device 104 and a verification server 108 being configured to use the same algorithm to generate a value that changes each time they invoke the algorithm. To this end, the user device 104 and the verification server 108 each include a processing mechanism (114, 116) to execute at least one type of one-time password algorithm. As long as the same inputs are provided to the algorithms, the user device 104 and the verification server 108 will both generate the same value each time they invoke the algorithm. In a typical implementation the inputs to the algorithms include one or more a parameters such as a seed, a count, a time value, etc., where one or more of the parameters changes at each calculation to increase the randomness of the calculated value, i.e., the one-time password. Accordingly, the service provider 102 can verify that it has received a request from an authorized device (or user) based on a comparison of the one-time-password expected from the device 104 (as generated by the verification server 108) with the one-time-password received from the device 104.

The use of one-time-password-based verification may thus provide some measure of protection against unauthorized access to the services provided by the service provider 102. For example, in the event a user enters his or her credentials into a phishing site or the credentials are logged by spyware, etc., those credentials can only be used one time. Any subsequent access to the service would require the new one-time-password value.

Moreover, one-time-password-based verification is relatively similar in complexity to the password verification techniques that many service providers already use. In contrast, verification techniques that incorporate public key infrastructure may be much more difficult to implement and manage. Accordingly, one-time-password-based verification may advantageously provide additional security for on-line and other transactions using a relatively easy to implement and manage technique.

In practice, the verification server may verify the received one-time-password against a window of expected one-time-password values. For example, if the received one-time-password does not match the presently expected one-time-password, the service provider 102 may compare the received one-time-password against one or more one-time-password values that were expected before or are expected after the presently expected one-time-password. In this way, the verification server 108 may avoid re-synchronizing itself every time the changing parameter values used by the verification server 108 and the user device 104 are out of step.

In a typical implementation a verification server may verify the one-time-passwords generated by several remote devices (e.g. device 104). In this case, the verification server may maintain a record of the algorithm, seed values, count values, etc., maintained by each remote device. Thus, if desired, each remote device may be configured to generate a unique one-time-password.

The verification server 108 may be integrated into the service provider 102 or may comprise a separate entity. In the latter case, a mechanism (e.g., a communication channel 110) may be provided whereby the service provider 102 may forward the one-time-password value from a given device 104 to the verification server 108 and the verification server 108 sends an authorization message to the service provider 102 in the event there is a match. Alternatively, a mechanism may be provided whereby the service provider 102 requests a one-time-password for a given device 104 from the verification server 108, and the verification server 108 then sends the expected one-time-password value to the service provider 102. Typically, security measures may be in place to protect the values transmitted between the service provider 102 and the verification server 108.

The system 100 may include a mechanism by which the appropriate algorithm and associated parameters are installed in the verification server 108 and the user device 104. For example, the verification server 108 may send configuration information (e.g., algorithm type, seed value(s), etc.) to the device 104 via a communication channel 112. In some embodiments this may be accomplished using the data network 106. Such a mechanism also may be used to resynchronize the verification server 108 with the user device 104.

It should be appreciated that any type of one-time-password mechanism may be utilized in accordance with the teachings herein. In some embodiments a device 104 and verification server 108 uses a hash-based algorithm to generate a one-time-password. The algorithm may operate on and/or in conjunction with one or more algorithm-specific parameters (e.g., a seed value, a key, a count, a time value, etc.) that are modified in a known manner to generate a pseudo-random number. Examples of one-time-password algorithms include the HOTP algorithm proposed by the Initiative for Open Authentication ("OATH") and endorsed by the Internet Engineering Task Force ("IETF") and one-time-password algorithms supported by RSA Security, Inc.

In some embodiments the verification server 108 and user device 104 generate a one-time-password using a transaction-based technique. For example, a device 104 may generate a new one-time-password every time it sends a one-time-password to the service provider 102. In this case, the device 104 and verification server 108 may generate the one-time-password value based on a count. Again, the verification server 108 may synchronize its count with the count maintained by the device 104 as necessary.

In some embodiments the verification server 108 and user device 104 generate a one-time-password using a time-based technique. For example, a new one-time-password may be generated at specified times and/or time intervals. Here, provisions may be made to enable the verification server 108 to synchronize its timing with the timing of the device 104. It such an embodiment it is possible that a given one-time-password may be used more than once during a given time period. Alternatively, the time-based technique may be combined with a transaction-based technique to prevent a given one-time-password from being used more than once.

A user device 104 and/or a verification server 108 may incorporate a secure processor to generate the one-time-password. For example, in some embodiments a trusted platform module ("TPM") constructed in accordance with the specifications of the Trusted Computing Group ("TCG") generates the one-time-passwords. In general, a TPM provides a mechanism to securely generate and maintain keys used by an associated system. The TPM may be configured such that the TPM only uses keys when the TPM has verified that the keys are protected and the system is not corrupted. For example, the TPM may use a secure boot process and may only execute authenticated code.

A TPM may incorporate physical means of protection. For example, all of the functionality of the TPM may be implemented within a single integrated circuit. In addition, the TPM hardware may be protected using tamperproof and/or tamper evident techniques such as epoxy encapsulation.

A TPM also may use cryptographic techniques to protect information that it stores outside of the TPM. For example, the TPM includes at least one cryptographic processor that may be used, for example, to encrypt cryptographic keys or other sensitive data before the TPM stores the data in a data memory located outside of the TPM. Moreover, the TPM may not expose the keys used for this encryption outside the boundary of the TPM. For example, the TPM may never allow the encryption/decryption key to leave the TPM boundary.

In a conventional TPM application, the TPM generates and maintains keys for a user. For example, a user authorized to use the device within which the TPM is implemented may request the TPM to generate a key. Here, the TPM may require the user to create a password associated with the key. The TPM will thus only enable use of the key upon verification of the password. For example, when a user wishes to encrypt data using the key, the user may send the data to an encryption application and send the password to the TPM. In response, the TPM may receive the appropriate key from external memory (the key having been loaded into the TPM either by the TSS or by an application), use an internal cryptographic processor to decrypt the key then release the key to the encryption application. Similarly, when a user uses the TPM to sign data with the key, the user may send the data and the password to the TPM. In response, the TPM may retrieve the appropriate key from external memory and use an internal cryptographic processor to decrypt the key. Next, the TPM uses the key in an internal cryptographic processor to sign the data. The TPM then sends the signed data to the user (e.g., to the user's application). One advantage of the above approach is that in the event the device is stolen, the thief may not be able to access the keys protected by the TPM. Consequently, the thief may not be able to access any information protected by those keys.

Figure 2:
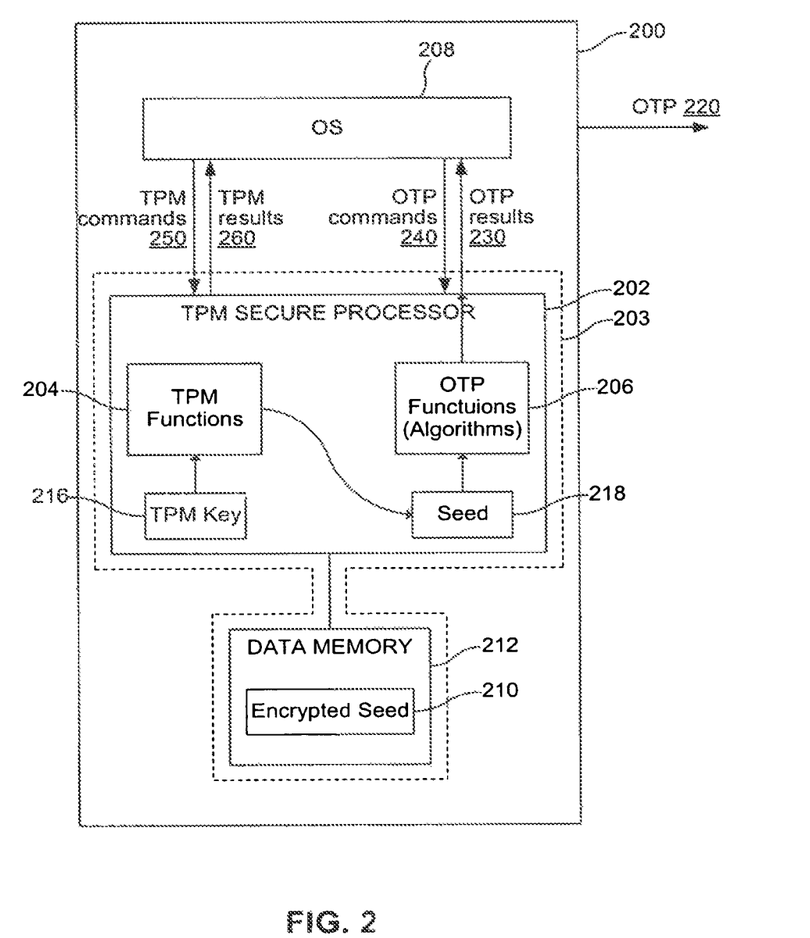
FIG. 2 is a simplified block diagram of one embodiment of a secure processing system constructed in accordance with the invention.

FIG. 2 illustrates one embodiment of a device 200 that incorporates a TPM 202, at a block diagram level. Device 200 may represent a verification server or a user device. TPM 202, in addition to providing TPM functionality 204, also provides secure processing functionality 206 to generate the one-time-password. For example, in some embodiments the TPM will maintain one-time-password-related data and algorithms within the TPM's security boundary 203 and perform one-time-password operations with this boundary. Security boundary 203 (e.g., as represented by the dashed line in FIG. 2) may be established, for example, using hardware and/or cryptographic techniques as discussed above.

In some embodiments the TPM 202 may maintain the one-time-password parameter data, such as a seed value, in encrypted form 210 (e.g., encrypted using a secure key such as a TPM key 216) in an external data memory 212. When the TPM 202 needs to generate a one-time-password, the TPM 202 will retrieve the encrypted parameter data from memory 212 and use its secure key (e.g., the TPM key 216) to decrypt the key within the security boundary. The TPM 202 then executes the appropriate one-time-password algorithm and outputs the one-time-password 220. Note that in an embodiment of the invention, memory 212 is managed by applications running on the platform of operating system 208.

Alternatively, in an embodiment where the TPM 202 includes a sufficient amount of memory, the TPM may store one-time-password-related data (e.g., seed 218) within the TPM 202. In this case, when the TPM 202 needs to generate a one-time-password the TPM 202 accesses the one-time-password-related data and executes the algorithm internally.

In either case, it should be appreciated that the TPM 202 only outputs the one-time-password (e.g., to the operating system 208). The TPM 202 does not release the one-time-password-related data outside the TPM boundary 203 (e.g., protected either cryptographically or physically). Accordingly, even if the current one-time-password value is compromised, the data (e.g., the parameters) needed for creating the next one-time-password value may not be compromised.

Moreover, the one-time-password algorithms 206 also may be maintained within the security boundary 203. Thus, even a proprietary algorithm that is implemented in a remote device such as a personal computer may be protected.

This technique stands in contrast with techniques where a TPM only protects the one-time-password parameters when the parameters are stored in data memory. Here, when the TPM needs to generate a one-time-password, the TPM decrypts the encrypted parameters and provides them to a one-time-password application external to the TPM. In such a technique the data needed for creating the next one-time-password value is thus more susceptible to being compromised.

Another advantage of the techniques aught herein may be that all of the applications may operate independently of one another even though TPM applications 204 and non-TPM applications share the processing capability of the TPM 202. Here, the TPM 202 may be configured so that the operation of the one-time-password applications 206 may not materially affect the operation of the TPM applications 204. Due, in part, to the method of implementing non-TPM operations as taught herein, non-TPM operations may be implemented such that they do not operate on or affect the data used by the TPM operations. For example, non-TPM operations may not cause the data and operations of the TPM 202 to be exposed outside of the TPM. Thus, the commands associated with the one-time-password application may be implemented such that they do not violate or compromise the security of the TPM 202. In this way, the TPM path may be certified as TPM compliant even though the TPM 202 supports other non-TPM functionality. In addition, non-TPM operations may be implemented such that the TPM 202, and only the TPM, controls the key space used within the TPM, including keys used for non-TPM operations.

In some embodiments at least a portion of the one-time-password operations are invoked by separate one-time-password-specific commands 240. Here, TPM commands 250 are provided to the TPM secure processor 202 to invoke TPM operations. In addition, one-time-password commands 240 and TPM commands 250 may be provided to the TPM secure processor 202 to invoke one-time-password-related operations 206.

In some embodiments the commands may be provided to the TPM via the same bus. However, the different commands may result in different, e.g., totally separate and isolated, processing within the TPM 202.

Figure 3:
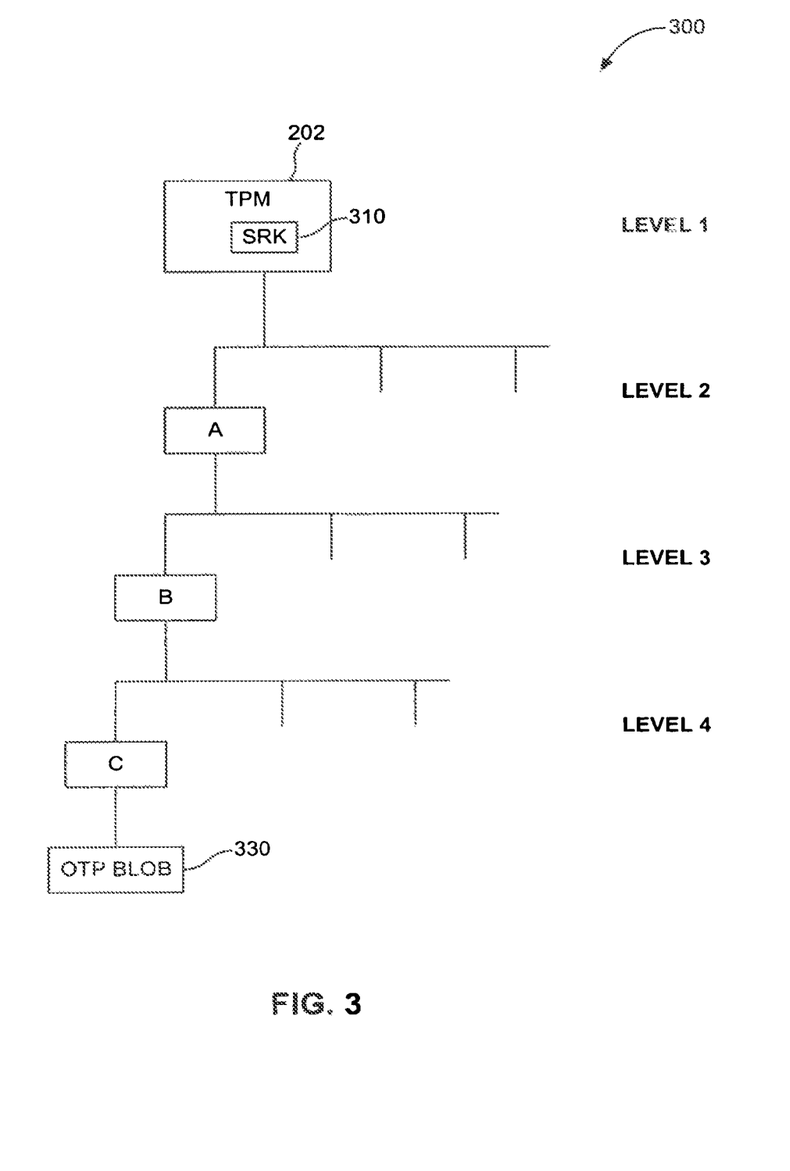
FIG. 3 is a simplified diagram of one embodiment of a key hierarchy in accordance with the invention.
Figure 4:
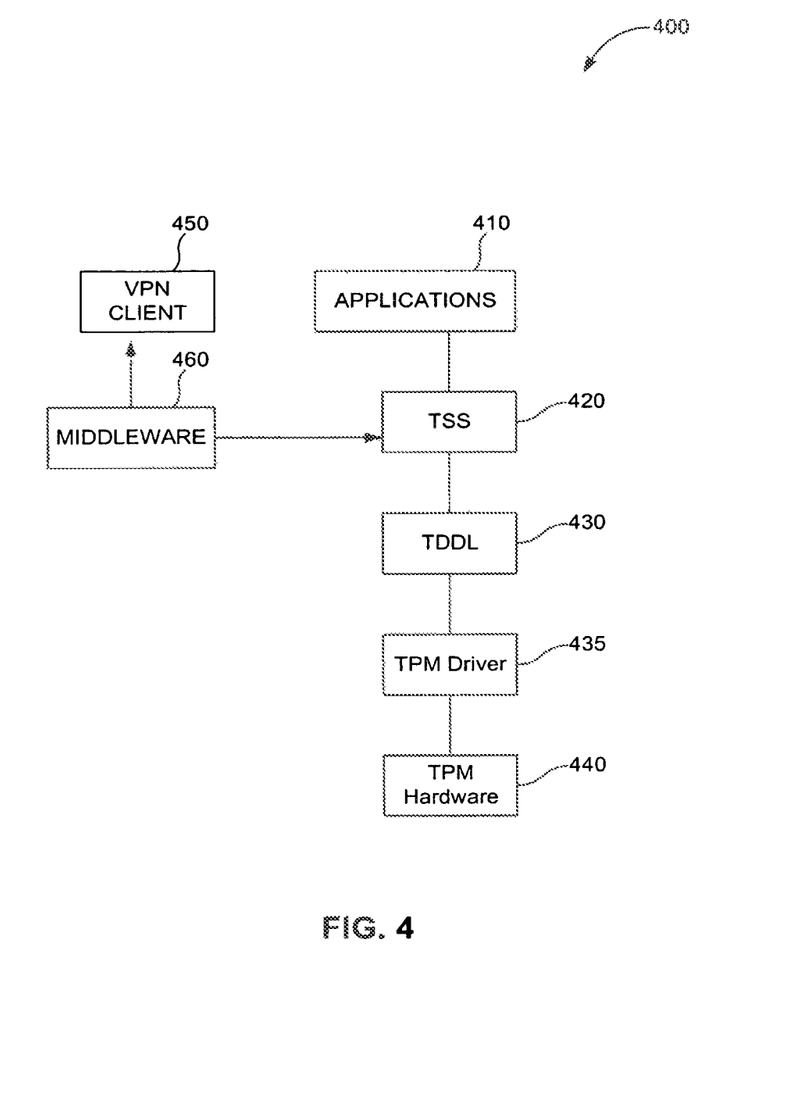
FIG. 4 is a simplified diagram of one embodiment of operation flow in accordance with the invention.

Referring now to FIGS. 3 and 4, additional details of how a TPM may be configured such that the resources of the TPM are used in a non-security-comprising manner to generate a one-time-password will be discussed. FIG. 3 depicts one embodiment of a key hierarchy that may be implemented using a TPM. FIG. 4 is a diagram depicting one embodiment of processing flow in a TPM.

In FIG. 3 the TPM uses a storage root key 310 (SRK) to encrypt keys at a next lower level (e.g., level 2) in the key hierarchy 300. The TPM generates the SRK 310 when a user takes ownership of the TPM in an embodiment of the invention. In some embodiments, the SRK 310 never leaves the TPM. Hence, the TPM provides a high level of protection for any keys encrypted by the SRK 310.

The TPM may then use keys (such as key A) at the second level of the hierarchy 300 to encrypt keys at a next lower level (e.g., level 3) and so on. This hierarchical technique provides, for example, a secure mechanism for providing keys for different applications.

To keep the size of the TPM as small as possible, a structure including the key and any associated data (referred to herein as a "key blob") are stored in external data memory in an embodiment of the invention. A key blob typically includes some information that is sensitive and some that is not sensitive. Accordingly, a TPM may only encrypt the sensitive information. A stored key blob may thus contain encrypted data and non-encrypted data.

When a user or application needs to use a key, the TPM may initially need to load in and decrypt all of the keys in the corresponding hierarchy. For example, to use key C, the TPM may first load in the appropriate key from level 2 (key A), decrypt key A using the SRK 310, then load in the appropriate level 3 key (key B), decrypt key B using key A, then load in the target key (key C) and decrypt that key using key B.

In practice, the TPM may implement measures to more efficiently gain access to the target key once the key has been accessed. Here, the user has proven that he has access to a given key. Accordingly, the TPM may store the key blob in a different format, a context blob. The TPM encrypts the context (e.g., using a key created for that purpose) except for context identification information. Software external to the TPM may then manage the resource by saving off the context and reloading it as necessary. As a result it is not necessary to load all of the keys in the upper layers of the hierarchy to use a key blob. Rather, the next time the user requests to use the target key, the TPM may invoke a relatively simple swapping technique to load in and decrypt the corresponding key blob context.

As discussed above, the TPM may be configured to use conventional TPM functionality to manage keys for one-time-password functions. A typical one-time-password uses algorithm-specific parameters such as a seed, and/or a count, etc. Accordingly, one or more structures (referred to herein as a token or a one-time-password blob 330) including these parameters may be defined for one-time-password functions.

In some embodiments the TPM is configured to manage a one-time-password blob 330 whereby a parent key of the one-time-password blob is used for loading and operating upon the one-time-password blob 330. Here, the parent key (e.g., key C in FIG. 3) of a one-time-password blob 330 has attributes that are similar to the attributes of a key blob in normal TPM operations. In this way, the TPM may treat the parent key of a one-time-password blob in the same way, hierarchically, as it treats a key blob in other TPM operations. This approach enables the one-time-password operations to be efficiently and securely implemented within the TPM structure.

For example, the TPM may manage loading and evicting of the parent key in the same way as any other key. Thus, the TPM may use its normal operations and resources to load and evict a key regardless of whether the key relates to a typical TPM-related operation or a one-time-password operation. This may thus avoid, for example, the need for using dedicated TPM internal memory for storage of one-time-password-specific keys or the need for custom commands or operations to load and evict one-time-password-specific keys. Moreover, a one-time-password parent key may be efficiently loaded (after the first load) using the standard TPM swapping technique discussed above.

In addition, the TPM may use similar user authentication operations for the parent key and TPM keys. For example, a TPM typically incorporates a mechanism to associate user authentication (e.g., a password) with a given key. In conjunction with this mechanism, provisions may be made to enable certain users to access a given key and to enable the associated authentication parameter (e.g., password) to be changed. Through the use of similar key structures for TPM and one-time-password operations, such authentication capabilities may be provided for one-time-password operations without the need for one-time-password-specific resources (e.g., custom commands, key resources, etc.). These capabilities may thus be used to indirectly (via the one-time-password parent key) provide authorization control for a one-time-password blob 330.

Some embodiments may support migration of the one-time-password operations. For example, a user may be allowed to, in effect, move the one-time-password generating algorithm and current parameter data from one computing device to another computing device. In this case, through the use of similar key structures for TPM and one-time-password operations, such migration capabilities may be provided for one-time-password operations without the need for one-time-password-specific resources.

The above one-time-password-related operations may be performed using standard TPM commands. For example, a change authorization command may be invoked to set user authorization parameters. A create key command may be invoked to generate a one-time-password parent key. A load key command may be used to load a one-time-password parent key into the TPM. In addition, a delegate command may be used to delegate the use of a one-time-password blob parent key to another user. This command may thus indirectly delegate the use of the one-time-password blob 330 to the other user. Various operations such as revoking the delegation may be associated with the delegation command.

By using at least some of the same commands for TPM and one-time-password operations, system resources (e.g., code space) may be saved since it is not necessary to replicate those functions for the one-time-password operations. In addition, the processor executing the operations does need to interpret whether a given command is a TPM command or a one-time-password command. Moreover, the processor may not need to be configured to enforce different rules associated with different types of commands.

Also, the keys may be managed using the same trusted software stack ("TSS") normally used by the TPM. Accordingly, one-time-password operations may be added to a TPM without requiring the TSS to identify all commands as either TPM-specific or one-time-password-specific.

These and other aspects of treating a parent key of a one-time-password blob in the same manner as a TPM key may be better understood in conjunction with the description of exemplary operations that follow. FIG. 4 is a diagram depicting one embodiment of interactions between hardware, firmware and software in a TPM. Briefly, the TSS 420 provides an interface that enables applications 410 running on a device (e.g., a user device or verification server) to call into the TPM. Appropriate commands are thereby issued to the driver interface (TDDL) 430 and TPM driver 435. The device may incorporate a virtual private network ("VPN") client 450 to login to a data network.

In some embodiments middleware 460 may be used to provision the system. For example, middleware 460 may be used to load one-time-password information into the TPM.

For example, middleware 460 may provide an API that enables the verification server to load in any data that the TPM needs to create the one-time-password blob. In addition, middleware 460 may be used to configure the TPM with rules that specify how the TPM is to create a one-time-password.

Middleware 460 also may be used to send the one-time-password to a service provider. In some embodiments middleware 460 may take the one-time-password generated by the TPM and automatically integrate the one-time-password into a message for the VPN. For example, access to the VPN may require presentation of a one-time-password. In this case, when a user logs in to a network by, for example, entering a user name and password, the middleware 460 may automatically cause the TPM to generate the appropriate one-time-password. In addition, the middleware 460 may automatically combine the one-time-password from the TPM with the user credential. In this way, the one-time-password need not be displayed to the user, if desired, for example, for security reasons. In addition, the user need not bother with typing in the one-time-password (e.g., as would be the case in an embodiment where device simply displays the one-time-password value to the user and requires the user to then type in the one-time-password).

In some embodiments middleware 460 may be used to take the one-time-password generated by the TPM and automatically integrate the one-time-password into a web browser. For example, access to an on-line account may require entering a one-time-password into the appropriate location on a webpage. In this case, when a user accesses the web page and enters a user name and password, the middleware 460 may automatically issue a command requesting the TPM to generate the appropriate one-time-password. The middleware 460 may then load the one-time-password from the TPM into the webpage.

Figure 5:
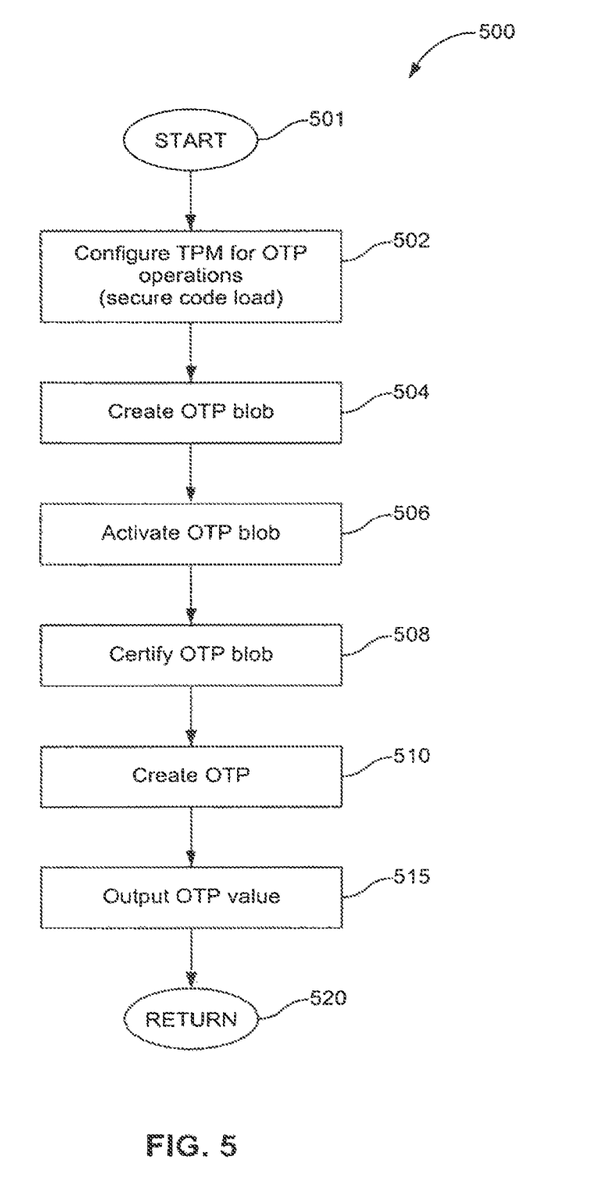
FIG. 5 is a flow chart of one embodiment of operations that may be performed in accordance with the invention.

Referring now to FIG. 5, one embodiment of operations that may be performed by a system that utilizes one-time-password authentication will be described in more detail. In particular, the described operations relate to creating a one-time-password blob and the generation and use of a one-time-password.

The process begins at step 501. Initially, as represented by block 502, the TPM may be configured to support one-time-password functionality. For example, code for one or more one-time-password-specific commands may be loaded into the TPM and the functions necessary to perform one or more one-time-password algorithms may be loaded into the TPM. The one-time-password-related code and other related parameters may be loaded into the TPM using a secure code loading technique as described, for example, in U.S. patent application Ser. No. 11/250,265, filed Oct. 13, 2005, the disclosure of which is incorporated by reference herein.

Creation (step 504) and activation (step 506) of a one-time-password blob typically involves generating a shared secret between the verification server and the TPM. The verification server and the TPM use the shared secret to calculate the one-time-password as discussed below. The shared secret may be a key (e.g., a random number) that is used in conjunction with a hash algorithm. In some embodiments the system uses the CTKIP algorithm to generate the shared secret. This algorithm will be described briefly in the discussion that follows.

Figure 6:
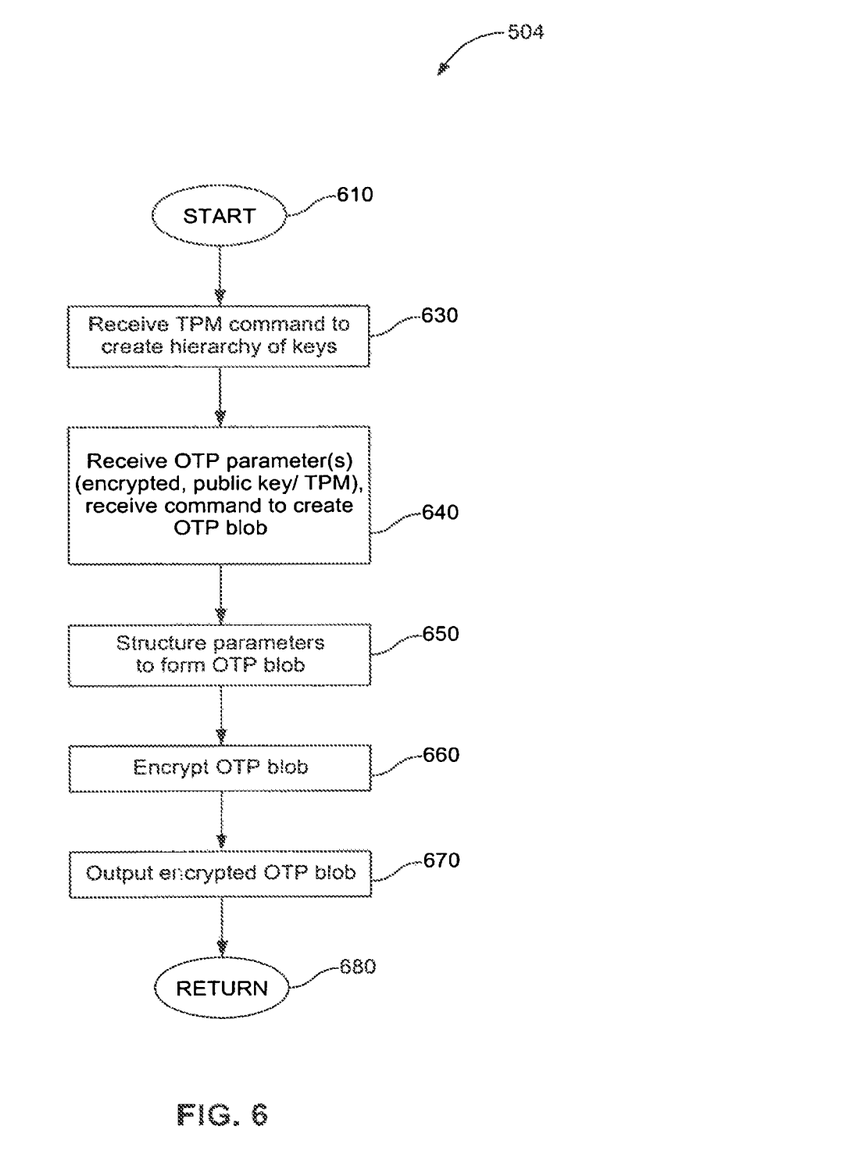
FIG. 6 is a flow chart illustrating the process of creating a one-time password blob, according to an embodiment of the invention.

Creation step 504 is illustrated in greater detail in FIG. 6. The process begins at step 610. In conjunction with this process an application issues a standard TPM command to create the necessary hierarchy keys. In embodiments that use CTKIP, the server also sends a public key to the middleware. This command is received in step 630. In addition, the middleware issues a create one-time-password blob command (including for example, a one-time-password blob identifier and the server's public key). To create a one-time-password blob, the verification server (or some other related server) sends the one-time-password-related parameters to the middleware; the parameters are received at the TPM (block 640). The create one-time-password blob command is also received by TPM in step 640. This command causes the TPM to form the one-time-password blob (e.g., the algorithm-related parameters) in step 650 and associate the keys with the one-time-password blob. Here, the parameters may include, for example, a one-time-password identifier and the server's public key, etc.). In embodiments that use CTKIP, the TPM may at this point generate a random number, encrypt the number using the server's public key and output the result. The middleware may thus forward the encrypted random number to the server.

The TPM uses conventional TPM functionality to encrypt the one-time-password blob with a key generated by the TPM (e.g., the one-time-password parent key) (step 660) and output the encrypted one-time-password blob (step 670). The encrypted one-time-password blob may be stored in external memory. Once the TPM stores the one-time-password blob in external memory, the blob may be managed by an application running externally to the TPM as discussed above. The process of creating the one-time-password blob concludes at step 680. At this point the TPM has created the one-time-password blob, but the blob is not yet active.

Figure 7:
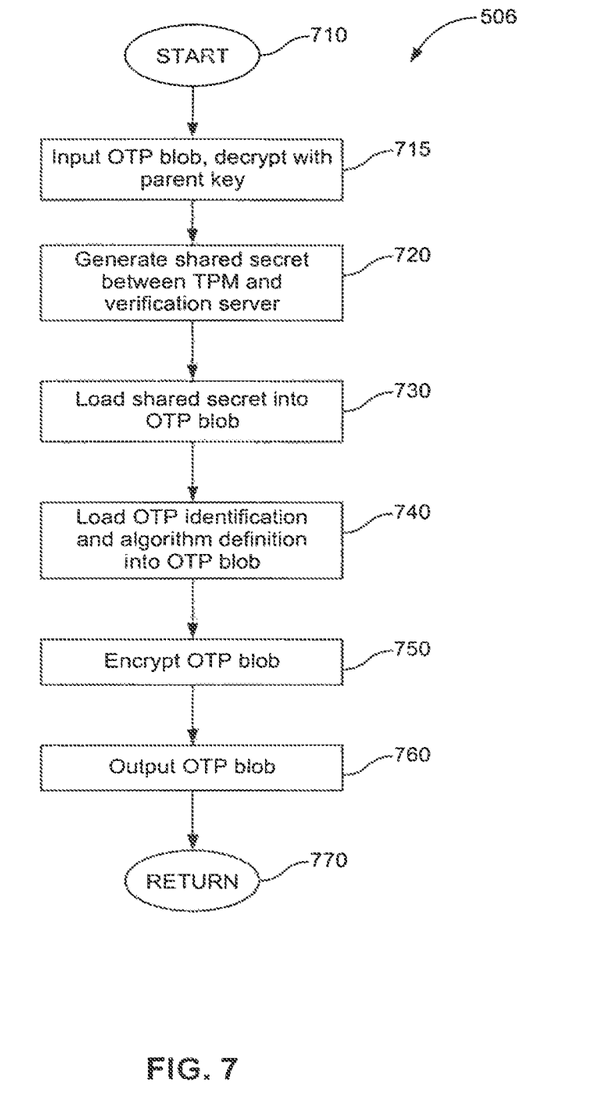
FIG. 7 is a flow chart illustrating the process of activating a one-time password blob, according to an embodiment of the invention.

Activation of the one-time-password blob (step 506 in FIG. 5) is illustrated in greater detail in FIG. 7. This process begins at step 710. In step 715, the OTP blob is input, then decrypted with the OTP blob parent key. Activation involves generating the shared secret between the verification server and the TPM (step 720). In embodiments that use CTKIP, the server generates a random number and sends the random number and a key identifier to be associated with the shared secret to the middleware.

Once the middleware receives the information from the verification server, the middleware invokes an activate one-time-password blob command. In response, the TPM uses a selected algorithm (e.g., a MAC) to operate on both the random number and the server's public key to generate the shared secret.

After the TPM and verification server generate the shared secret, in an embodiment of the invention, the TPM loads the shared secret into the one-time-password blob (step 730) along with, for example, the one-time-password identifier, an initial counter value and an algorithm definition (step 740). The TPM then encrypts the one-time-password blob in step 750, and stores the encrypted one-time-password blob in data memory in step 760. This process concludes in step 770.

Returning to FIG. 5, in some embodiments, a verification server may require that a one-time-password blob be certified (step 508) before the verification server will accept the corresponding one-time-password from the TPM. Here, certification may be used to prove that a given one-time-password was created by a valid TPM. In some embodiments the system performs this operation once, e.g., before the device attempts to use the one-time-password to authenticate to the verification server. In response to a certify one-time-password blob command, the TPM may sign data (e.g., a one-time-password identifier, etc.) using one of its private identity keys (e.g., the keys that the TPM typically uses to sign other keys). The TPM, via middleware, then sends the signed data along with a calculated one-time-password (as discussed below) to the verification server. The server has access to the certificate corresponding to the TPM's identity key though a third party certification authority. Accordingly, the verification server may thus verify that the data was signed by a trusted TPM. Once verified, the server may then trust any one-time-password associated with this verified one-time-password blob.

Note that once configuration step 502 is completed, the sequence of steps 504-508 is performed whenever an OTP blob is created.

The creation of the one-time password is represented by step 510 of FIG. 5. This step is shown in greater detail in FIG. 8. The process begins at step 810. Once a one-time-password blob has been created, a generate one-time-password command may be invoked to cause the TPM to use the one-time-password blob to generate a one-time-password. This command is received in step 820. As discussed above, middleware may automatically invoke this command in response to a user commencing a login operation or similar operation. The caller of this command also includes the appropriate user authorization (e.g., password) with the request. Authorization is performed in step 830.

Figure 8:
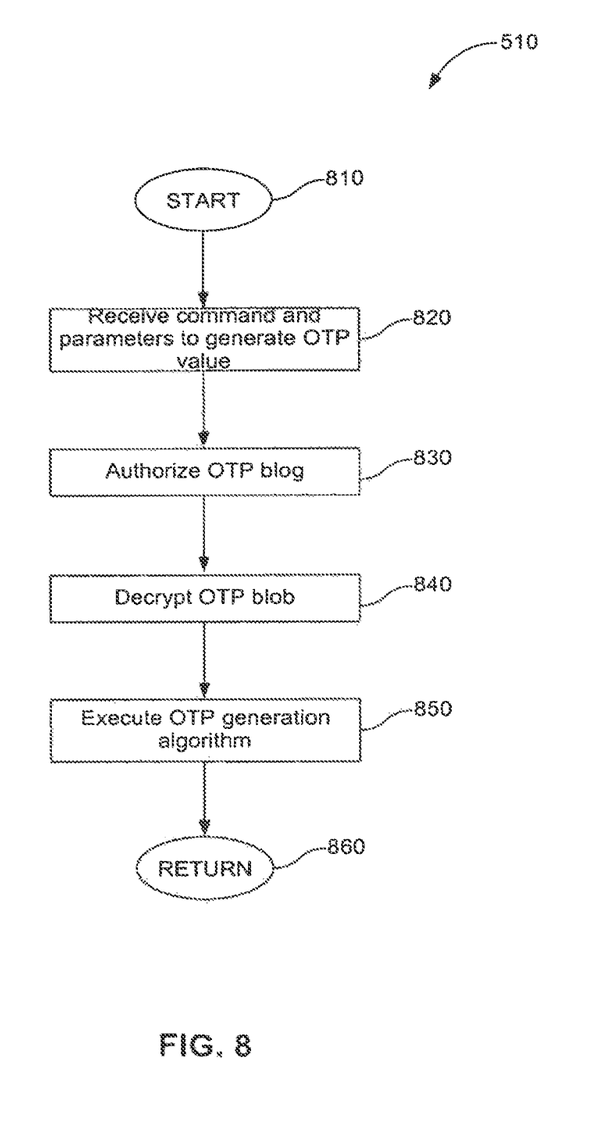
FIG. 8 is a flow chart illustrating the process of creating a one-time password, according to an embodiment of the invention.

Here, because the TPM treats the one-time-password parent key like any other key, the TSS may simply evict one of the keys in the TPM, if necessary, and load the one-time-password parent key and manage the resources essentially like any other key. Here, however, instead of handing the result of a decryption operation up to the application as in a typical TPM key management operation, the TPM performs the one-time-password calculation and hands up the result of the calculation. That is, after the TPM loads and decrypts the parent key, the parent key is used to form a command to load in the one-time-password blob, decrypt it (step 840) and perform the one-time-password operation (step 850). The process concludes in step 860.

Returning to FIG. 5, in step 515, an OTP value is output. The process concludes at step 520. Note that steps 510 and 515 are generated every time a new OTP value is needed.

Note that in an embodiment of the invention, the one-time-password algorithm code may be stored in an internal TPM code memory or in an external flash memory. In the latter case, the TPM may store the code in encrypted form using, for example, the secure code load mechanism discussed above. Briefly, the TPM uses a mechanism to determine the location of the code in external flash and uses a protected key to encrypt/decrypt and/or authenticate the code stored in flash.

In some embodiments the one-time-password algorithm is an HMAC (e.g., HMAC-SHA1) algorithm that uses a key (the shared secret) and a counter to generate the one-time-password. As discussed above, the server synchronizes its counter value with the TPM's counter value. In some embodiments the TPM increments the counter every time the TPM generates a new one-time-password. Typically the server uses a window of expected values to account for synchronization problems caused by, for example, one or more one-time-passwords not reaching the server.

In some embodiments the TPM uses a time-based one-time-password algorithm. Here, time will be provided to the respective TPMs as a parameter to computation of the one-time-password values. The verification server may need to accommodate any offset in time with the user device.

In embodiments where the device displays the one-time-password to a user, after the TPM at the user device outputs the one-time-password, the middleware may truncate the one-time-password and convert it to human readable form. In any event, the TPM at the user device will update the one-time-password blob and load it back into external memory (encrypted as necessary).

From the above, it should be appreciated that the teachings herein may be used to provide a mechanism for securely generating one-time-passwords on a TPM in a manner that, conserves the resources of the TPM. Here, a TPM may handle a one-time-password blob parent key the same way it handles a standard key blob for the entire TPM hierarchy. This may relate to, for example, how the key blobs are stored, which user's have access to the key blobs, how the TPM performs authorization to use the key blobs (e.g., binding passwords to release a key) and how a key blob may be moved from platform to platform. Accordingly, less code is needed to implement the one-time-password functionality and the TPM does not require additional key storage. As a result, a TPM may be implemented using relatively small footprint on the die.

A TPM as described herein may be used in a variety of applications. For example, a TPM may be incorporated in a variety of user devices as discussed above. In some embodiments the TPM may be implemented on a network interface such as a Gigabit Ethernet controller in a computing device. Here the controller may be implemented in a network interface card ("NIC"), as part of a LAN-on-Motherboard ("LoM") solution or another configuration.

It should be appreciated that the various components and techniques described herein may be incorporated in system independently of the other components and techniques. For example, a system incorporating the teachings herein may include various combinations of these components and techniques. Thus, not all of the components and techniques described herein may be employed in every such system.

Different embodiments of the invention may include a variety of hardware and software processing components. In some embodiments of the invention hardware components such as controllers, state machines and/or logic are used in a system constructed in accordance with the invention. In some embodiments code such as software or firmware executing on one or more processing devices may be used to implement one or more of the described operations.

The components and functions described herein may be connected and/or coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may comprise electrical signals transmitted over a wire, light pulses transmitted through an optical medium such as an optical fiber or air, or RF waves transmitted through a medium such as air, etc. A signal may comprise more than one signal. For example, a signal may consist of a series of signals. Also, a differential signal comprises two complementary signals or some other combination of signals. A group of signals may be collectively referred to herein as a signal. Signals as discussed herein also may take the form of data. For example, in some embodiments an application program may send a signal to another application program. Such a signal may be stored in a data memory.

A wide variety of devices may be used to implement the data memories discussed herein. For example, a data memory may comprise RAM, ROM, flash memory, one-time-programmable memory, a disk drive, or other types of data storage devices.

While some embodiments of the present invention have been described above, it should be understood that it has been presented by way of examples only and not meant to limit the invention. It will be understood by those skilled in the art that various changes in form and detail may be made therein without departing from the spirit and scope of the invention as defined in the appended claims. Thus, the breadth and scope of the present invention should not be limited by the above-described exemplary embodiments, but should be defined only in accordance with the following claims and their equivalents.

What is claimed is:

1. An apparatus for securely generating a first one-time password, the apparatus comprising:
   a data memory;
   a secure processor configured to store a shared secret in a binary large object (blob) structure in the data memory and execute a one-time password algorithm to generate the first one-time password using the shared secret, wherein the secure processor is configured to maintain the shared secret within a security boundary of the secure processor and execute the one-time password algorithm within the security boundary, and wherein the secure processor is configured to use a storage root key of the secure processor to encrypt the blob structure; and
   a memory manager, external to the secure processor, configured to manage the data memory.

2. The apparatus of claim 1, wherein the secure processor comprises a plurality of cryptographic processors.

3. The apparatus of claim 2, wherein one of the plurality of cryptographic processors is configured to encrypt the shared secret before storing the shared secret in the data memory to maintain the shared secret within the security boundary of the secure processor.

4. The apparatus of claim 1, wherein the data memory is external to the secure processor.

5. The apparatus of claim 4, wherein the secure processor is configured to encrypt the shared secret before storing the shared secret in the data memory to maintain the shared secret within the security boundary of the secure processor.

6. The apparatus of claim 1, wherein the secure processor is configured to store a definition for the one-time password algorithm in the blob structure in the data memory and execute the one-time password algorithm in accordance with the definition.

7. The apparatus of claim 1, further comprising:
   a verification module configured to receive a second one-time password from a user device and perform a comparison operation to determine whether the second one-time password from the user device matches the first one-time password,
   wherein the secure processor is configured to permit the user device to access a service or data provided by a service provider based on the comparison operation determining that the second one-time password from the user device matches the first one-time password.

8. The apparatus of claim 7, wherein the user device is a wireless phone.

9. The apparatus of claim 1, wherein the apparatus is a user device and the secure processor is configured to send the first one-time password to a verification server to access a service or data provided by a service provider.

10. The apparatus of claim 1, wherein the secure processor is further configured to perform a hash function.

11. The apparatus of claim 10, wherein the hash function includes a SHA-1 hashing algorithm.

12. The apparatus of claim 1, wherein the one-time password algorithm comprises a hashing algorithm.

13. The apparatus of claim 1, wherein the one-time password algorithm is a time-based algorithm.

14. The apparatus of claim 1, wherein the shared secret comprises a key.

15. An apparatus for securely generating a first one-time password, the apparatus comprising:
    a data memory;
    a secure processor configured to store a definition for a one-time password algorithm in a binary large object (blob) structure in the data memory and execute the one-time password algorithm in accordance with the definition to generate the first one-time password using a shared secret, wherein the secure processor is configured to maintain the definition and the shared secret within a security boundary of the secure processor and execute the one-time password algorithm within the security boundary of the secure processor, and wherein the secure processor is configured to use a storage root key of the secure processor to encrypt the blob structure; and
    a memory manager, external to the secure processor, configured to manage the data memory.

16. The apparatus of claim 15, wherein the secure processor comprises a plurality of cryptographic processors.

17. The apparatus of claim 16, wherein one of the plurality of cryptographic processors is configured to encrypt the definition before storing the definition in the data memory to maintain the definition within the security boundary of the secure processor.

18. The apparatus of claim 15, wherein the data memory is external to the secure processor.

19. The apparatus of claim 18, wherein the secure processor is configured to encrypt the definition before storing the definition in the data memory to maintain the definition within the security boundary of the secure processor.

20. The apparatus of claim 15, wherein the secure processor is configured to store the shared secret in the blob structure in the data memory.

21. The apparatus of claim 15, further comprising:
    a verification module configured to receive a second one-time password from a user device and perform a comparison operation to determine whether the second one-time password from the user device matches the first one-time password,
    wherein the secure processor is configured to permit the user device to access a service or data provided by a service provider based on the comparison operation determining that the second one-time password from the user device matches the first one-time password.

22. The apparatus of claim 21, wherein the user device is a wireless phone.

23. The apparatus of claim 15, wherein the apparatus is a user device and the secure processor is configured to send the first one-time password to a verification server to access a service or data provided by a service provider.

24. An apparatus for securely generating a first one-time password, the apparatus comprising:
    a data memory; and
    a secure processor configured to store both a shared secret and a definition for a one-time password algorithm in a binary large object (blob) structure in the data memory and execute the one-time password algorithm in accordance with the definition to generate the first one-time password using the shared secret, wherein the secure processor is configured to maintain both the shared secret and the definition within a security boundary of the secure processor and execute the one-time password algorithm in the security boundary, and wherein the secure processor is configured to use a storage root key of the secure processor to encrypt the blob structure; and a memory manager, external to the secure processor, configured to manage the data memory.

25. The apparatus of claim 24, wherein the secure processor comprises a plurality of cryptographic processors.

26. The apparatus of claim 24, wherein the data memory is external to the secure processor.

* * * * *